INVENTORS.
HERMAN G. MINSHELL
ROBERT J. STUMPF
WILLIAM J. MATTES

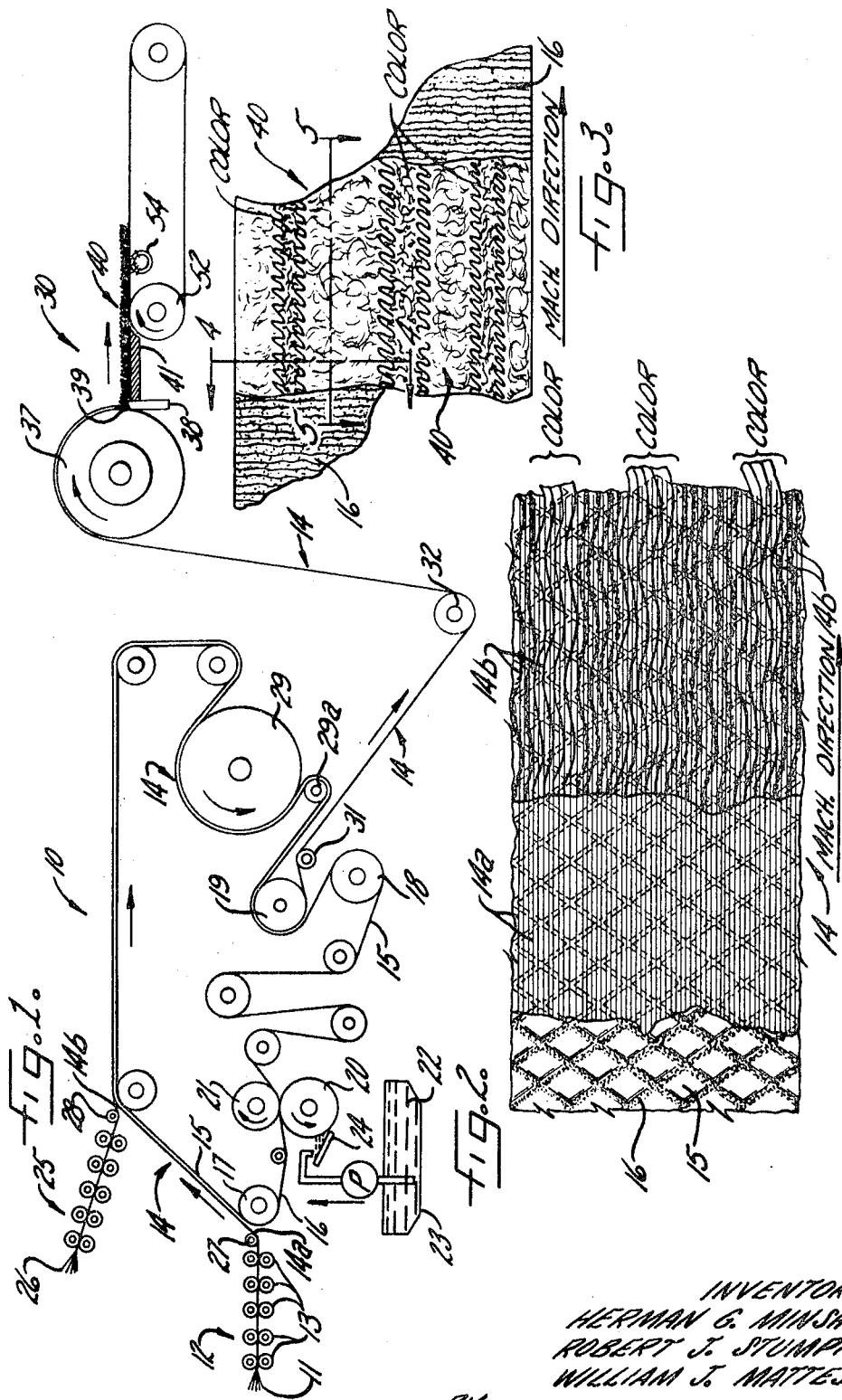

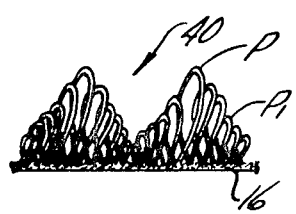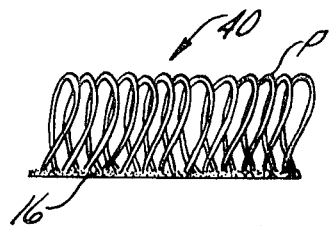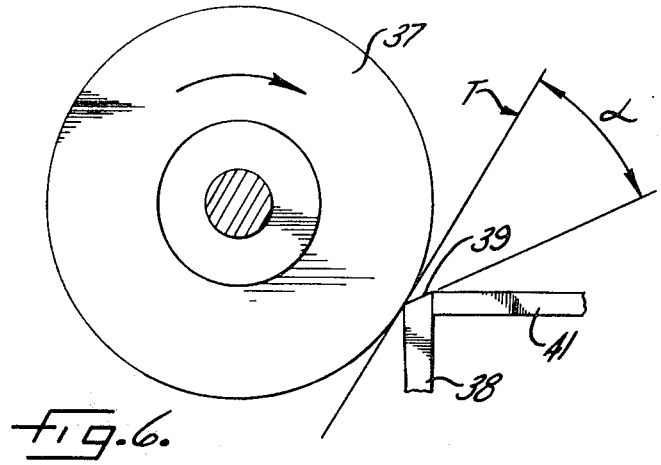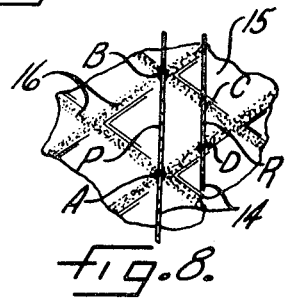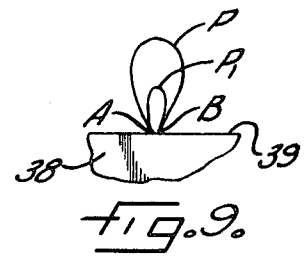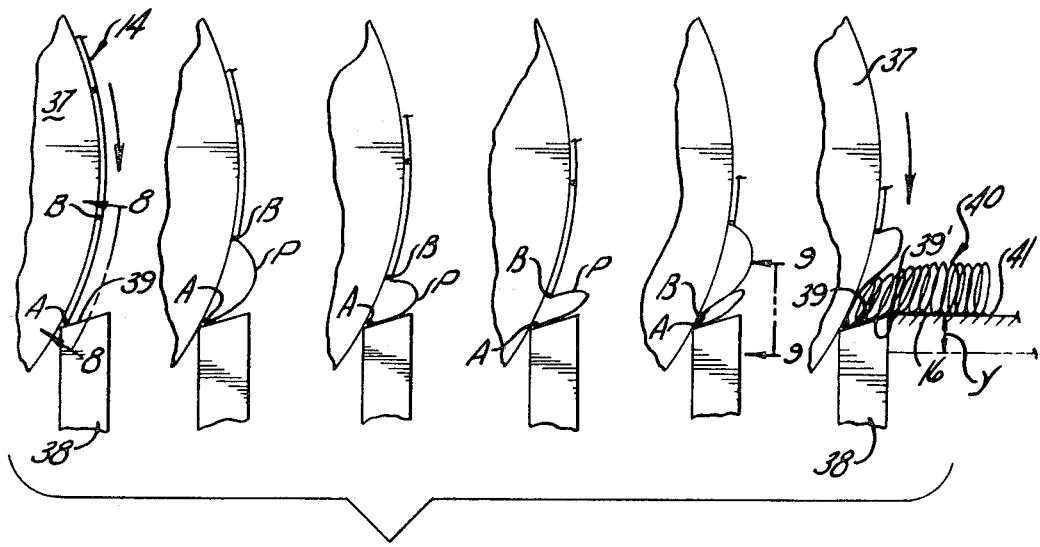

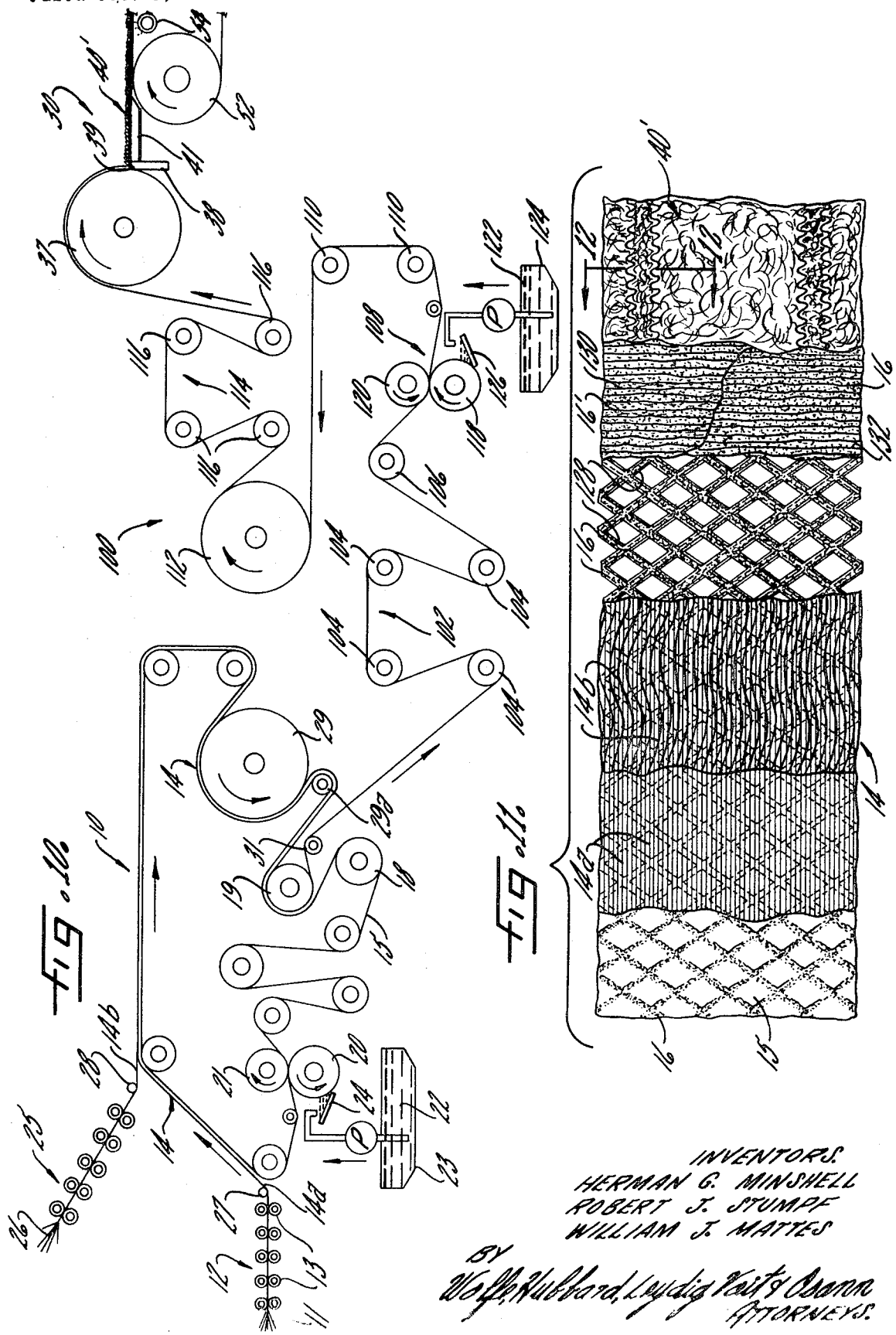

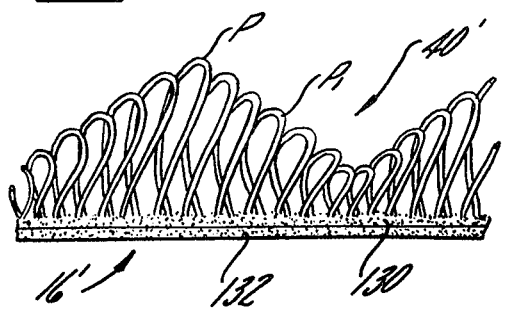
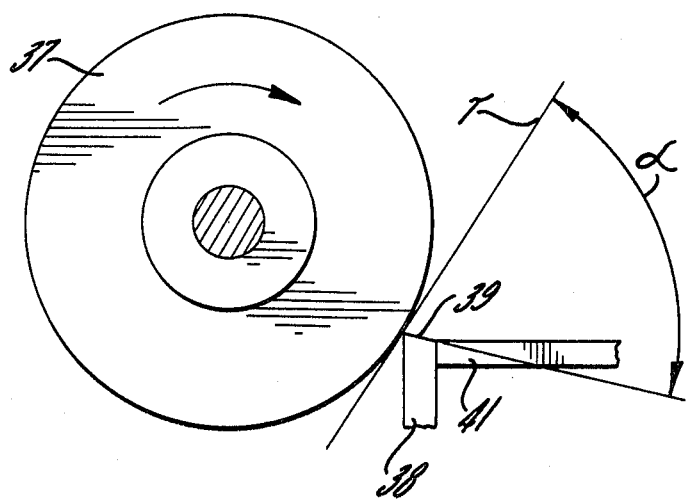

INVENTORS.
HERMAN G. MINSHELL
ROBERT J. STUMPF
WILLIAM J. MATTES
BY
Wolfe, Hubbard, Leydig, Voit & Osann
ATTORNEYS.

United States Patent Office 3,729,353
Patented Apr. 24, 1973

3,729,353
METHOD OF PRODUCING A HIGH-LOFT, NONWOVEN FABRIC
Robert J. Stumpf, Appleton, William J. Mattes, Neenah, and Herman G. Minshell, Menasha, Wis., assignors to Kimberly-Clark Corporation, Neenah, Wis.
Filed Oct. 5, 1970, Ser. No. 77,840
Int. Cl. D04h *11/00*
U.S. Cl. 156—72                                12 Claims

ABSTRACT OF THE DISCLOSURE

A high-loft, nonwoven fabric with a backing layer of adhesive and a multiplicity of fibers looped outwardly from the backing; and a method and apparatus for making the fabric by first embedding a web of elements in an open pattern of adhesive, bonding the elements in the adhesive, applying a second adhesive in an open pattern to the first open pattern, and consolidating the adhesives into a continuous backing layer while looping the elements outwardly from the backing. In certain instances the backing may be substantially stretched, resulting in a fabric with a partially consolidated backing layer. The second application of adhesive provides for better element attachment to the backing layer, enabling the use of heavier elements, such as natural or synthetic threads or yarns.

RELATED APPLICATIONS

George H. Saunders, Robert C. Sokolowski and Robert J. Stumpf, Ser. No. 498,929, filed Oct. 20, 1965 now abandoned and replaced by Ser. No. 79,287, filed Oct. 8, 1970.

Ronald H. Wideman, Ser. No. 551,605, filed May 20, 1966 and now U.S. Pat. No. 3,553,064.

Robert J. Stumpf and William L. Mowers, Ser. No. 553,483, filed May 27, 1966, now Pat. No. 3,553,065.

Robert J. Stumpf, Ser. No. 769,959, filed Oct. 23, 1968, now abandoned, and replaced by Robert J. Stumpf, Ser. No. 31,225, filed Apr. 23, 1970.

Robert J. Stumpf, Ser. No. 820,224, filed Apr. 29, 1969.

DESCRIPTION OF THE INVENTION

The present invention relates in general to nonwoven fabrics and, more particularly, to methods for making high-loft, nonwoven fabrics and to products formed by such methods.

In recent years, many different types of nonwoven materials have been produced, both to replace conventional woven fabrics and, also, to create new markets in which woven fabrics have not yet become established. This is particularly true in the case of materials for single-use and disposable products, such as: sanitary supplies, hospital garments, disposable sheets, and the like. For these applications the nonwoven fabric is geenrally made in continuous sheet form with one or more layers of staple length fibers and/or a reinforcing scrim structure adhesively bonded together or laminated between plies of other material such as cellulosic wadding and plastic sheeting. The fibers may be natural, synthetic or various blends and, of course, the particular composition of the nonwoven fabric is greatly influenced by its intended use.

Exemplary of such nonwoven fabrics are those disclosed in U.S. Pat. Nos. 2,902,395, 3,047,444, 3,072,511, 3,327,708, 3,484,330, 3,553,064 and 3,553,065, and the aforesaid copending United States patent application, Ser. No. 79,287, which is to the same assignee as the present application. While the products disclosed in the foregoing issued patents and copending applications have many different attributes and characteristics, they all have one thing in common—viz, the principal fibers are nearly all disposed substantially parallel to the surfaces of the nonwoven material. As a result, the material is either relatively thin and flat or, such substantial thickness and surface texture as are imparted to the fabric are provided by creping or embossing various layers of the material or, in some instances, the final nonwoven fabric.

It is also well-known that natural fibers, particularly cotton and wool, have an inherent kink or crimp resulting from the way in which these fibers grow. This natural crimp is, of course, highly beneficial and contributes largely to the strength of thread made of a multiplicity of staple length fibers. In addition, it is the natural crimp of these fibers that imparts certain charatceristics of texture and body to materials woven therefrom.

In contrast, synthetic fibers, as initially formed, do not have any appreciable kink or crimp since they are generally formed in continuous monofilaments. However, it is also well-known that most synthetic fibers can be crimped and heat-set by passing the fibers through a heated stuffing box.

It is the primary aim of the present invention to provide a method of making a nonwoven material which differs from the above and which is characterized by the simultaneous looping of a large number of fibers, threads or the like and the incorporation of the thus looped elements into a nonwoven fabric with the elements extending outwardly from the backing material, thereby producing a novel high-loft fabric with a pleasing surface texture and appearance.

A related object of the invention is the provision of a method of making an improved high-loft, nonwoven fabric in which the substantially continuous adhesive backing layer from which the fibers loop outwardly may subsequently be stretched, perforated or otherwise opened to form a discontinuous backing layer.

It is a further object to provide a method as described above which permits blending together fibers of differing colors or other characteristics in the initial web in order to achieve a high-loft, nonwoven fabric having a colored pattern or other desired characteristics of texture and/or appearance.

In one of its more specific aspects, it is an object of the invention to provide a simple and economical method of making a nonwoven fabric from a web of fibers or threads having two layers of adhesive previously applied in a pattern to one side of the web, by consolidating the adhesives into a backing layer while simultaneously looping the fibers outwardly from the backing.

In another specific aspect of the invention, it is an object of the invention to provide a high-loft, nonwoven fabric and apparatus for making the same wherein the fabric is produced by bonding a web of fibers or threads in an open pattern of adhesive, subsequently applying a second open adhesive pattern to the first pattern of adhesive to improve the fiber attachment, thereby enabling the use of heavier threads, yarns, or the like, and consolidating the adhesive into a backing layer while simultaneously looping the fibers or threads outwardly from the backing.

Other objects and advantages of the present invention will become more readily apparent upon reading the following detailed description and upon reference to the attached drawings, in which:

FIG. 1 is a schematic view, in side elevation, of one form of apparatus which may be employed to produce a high-loft, nonwoven fabric;

FIG. 2 is a fragmentary plan view of an illustrative web of base material while still supported on a conveyor belt, somewhat simplified and exaggerated for the sake of clarity of illustration, with portions broken away to expose the various layers;

FIG. 3 is a fragmentary plan view of one embodiment of the product made by the apparatus of FIG. 1;

Figure 14:
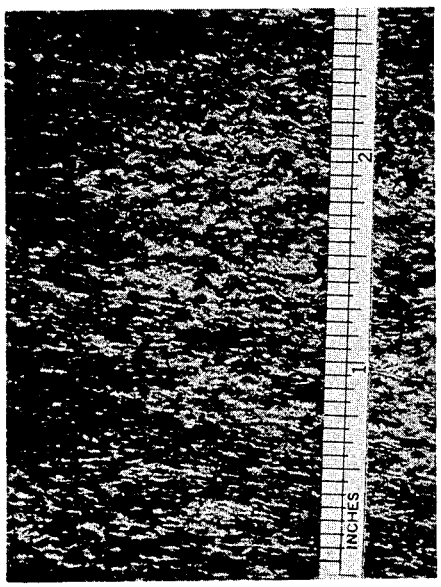
Figure 15:
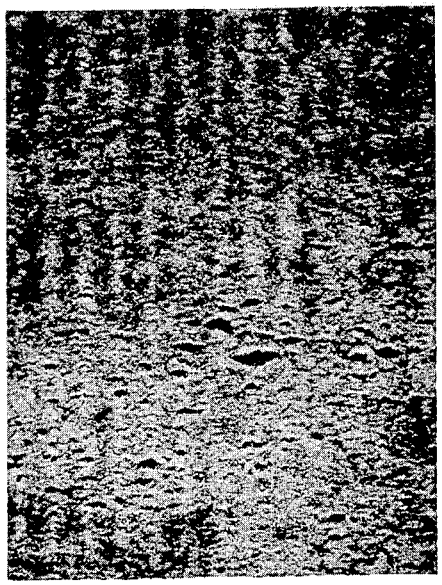
Figure 16:
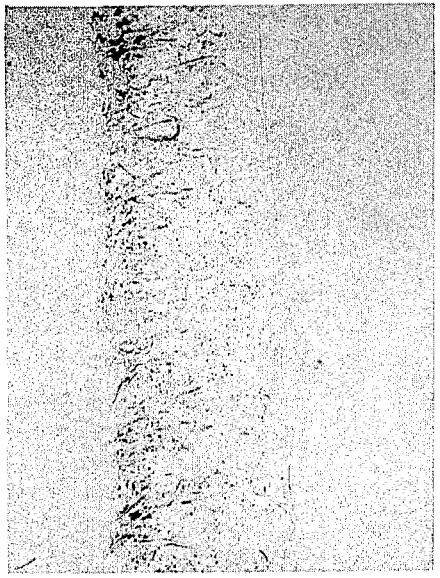
Figure 17:
Figure 18:
Figure 19:
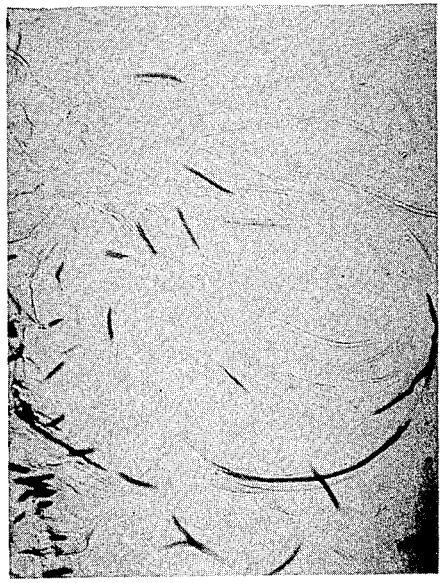
Figure 20:
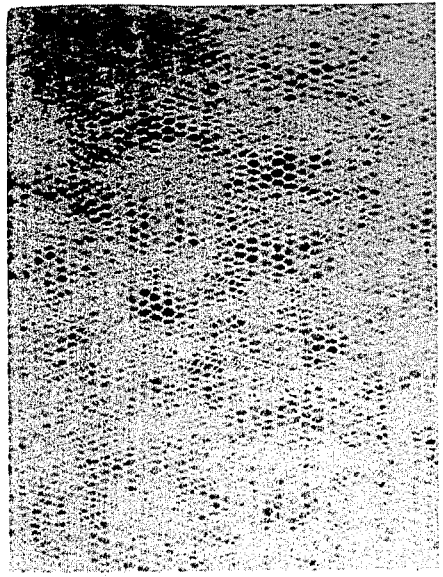
Figure 21:
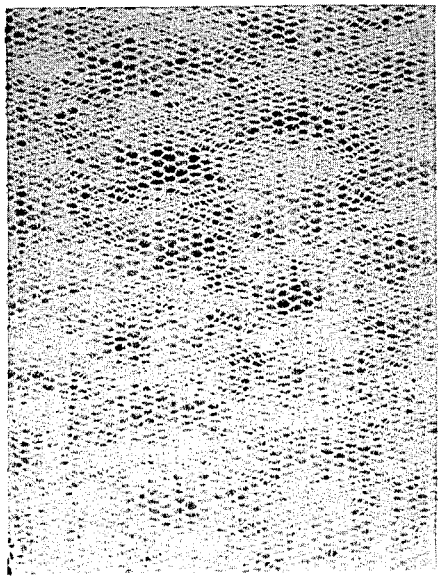
Figure 22:
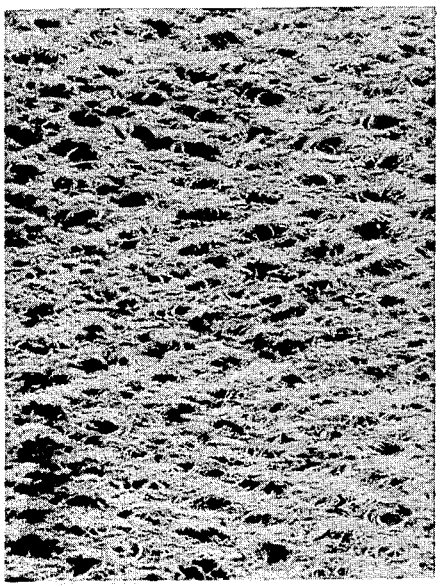
Figure 23:
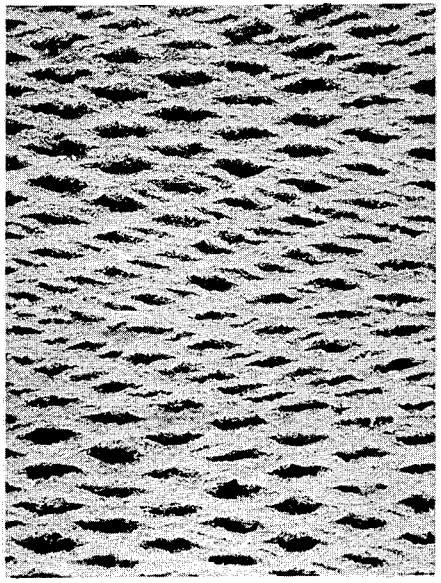
Figure 24:
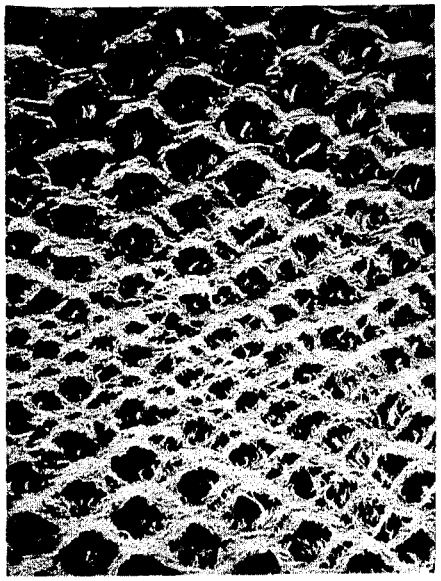
Figure 25:
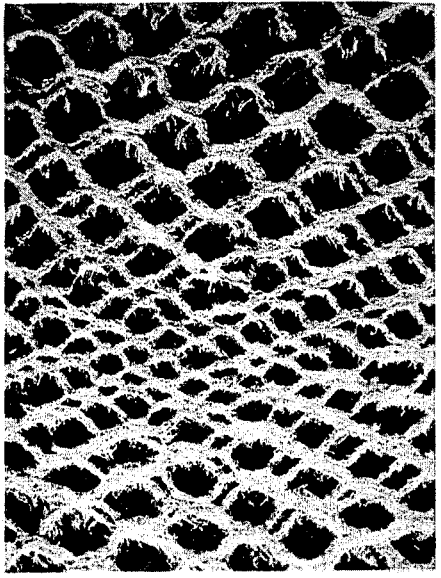
Figure 26:
Figure 27:
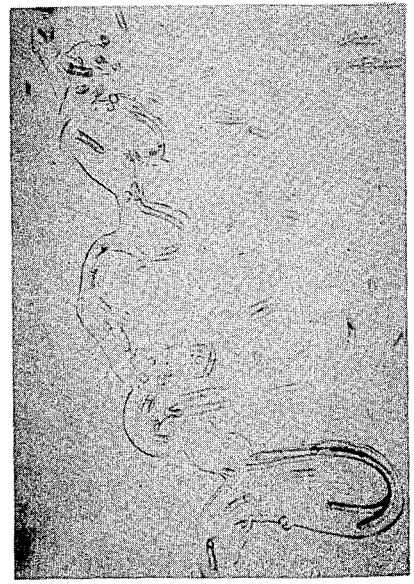
Figure 28:
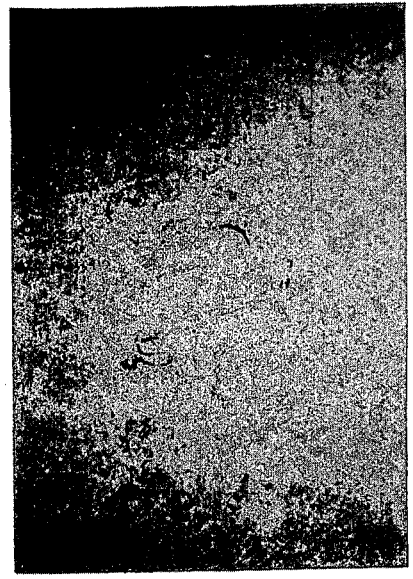
Figure 29:
Figure 30:
Figure 31:
Figure 32:
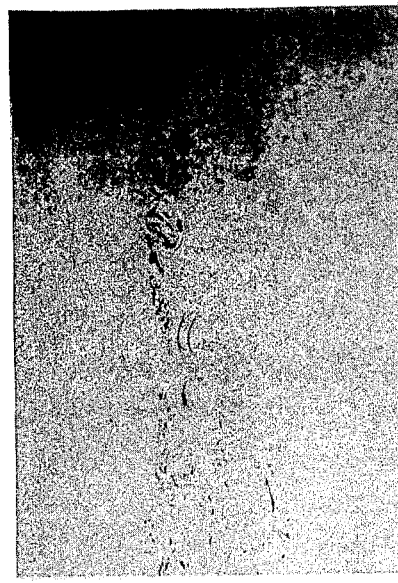
Figure 33:

FIGS. 4 and 5, respectively, are greatly enlarged, simplified, and somewhat exaggerated sectional views taken substantially along the lines 4—4 and 5—5 in FIG. 3;

FIG. 6 is an enlarged schematic detail view, in side elevation, of the forming drum and gathering blade of the apparatus shown in FIG. 1;

FIG. 7 is an enlarged schematic side elevational view illustrating, in somewhat idealized fashion, successive stages in the sequence of gathering and looping of individual fibers;

FIG. 8 is an enlarged schematic fragmentary view, taken substantially along the line 8—8 of FIG. 7, here showing a fragment of the fiber web and adhesive pattern with illustrative fibers attached to the adhesive;

FIG. 9 is a simplified schematic view, taken substantially along the line 9—9 of FIG. 7, here showing the fragment of the fiber web and adhesive pattern depicted in FIG. 8 at a later stage in the loop forming sequence;

FIG. 10 is a schematic view, in side elevation, of one form of apparatus that may be employed to practice a method of the present invention;

FIG. 11 is a fragmentary plan view of an illustrative web of base material having two applications of adhesive, the view being somewhat simplified and exaggerated for the sake of clarity of illustration, with portions broken away to expose the various layers;

FIG. 12 is a greatly enlarged, simplified and somewhat exaggerated sectional view taken substantially along the line 12—12 of FIG. 11;

FIG. 13 is an enlarged schematic detail view, in side elevation, similar to FIG. 6, illustrating the forming drum and pattern blade of the apparatus shown in FIG. 10, with the blade edge angle α being significantly greater to form a partially consolidated backing layer;

FIGS. 14 and 15, respectively, are somewhat enlarged photographic reproductions of top and bottom views of a fully consolidated web with the second adhesive pattern out of register with the first adhesive pattern;

FIGS. 16 and 17, respectively, are photographic reproductions of a fully consolidated web having the second adhesive pattern out of register with the first, showing a cross section in the machine direction and enlarged 13 and 50 times;

FIGS. 18 and 19, respectively, are photographic reproductions of a fully consolidated web having the second adhesive pattern out of register with the first, showing a cross section in the cross direction and enlarged 13 and 50 times;

FIGS. 20 and 21, respectively, are photographic reproductions of the top and bottom of the partially consolidated web having the second adhesive pattern out of register with first;

FIGS. 22 and 23, respectively, are greatly enlarged top and bottom photographic reproductions similar to the views of FIGS. 20 and 21;

FIGS. 24 and 25, respectively, are photographic reproductions of the web illustrated in FIGS. 22 and 23, but have taken after the web has been drawn or stretched in the machine direction;

FIGS. 26 and 27, respectively, are photographic reproductions of a partially consolidated web having the second adhesive pattern out of register with the first, illustrating a cross section in the machine direction magnified 13 and 50 times;

FIGS. 28 and 29, respectively, are photographic reproductions similar to FIGS. 26 and 27, here taken after the web has been drawn or stretched in the machine direction;

FIGS. 30 and 31, respectively, are photographic reproductions of a partially consolidated web having the second adhesive pattern out of register with the first, illustrating a cross section in the cross direction magnified 13 and 50 times;

FIGS. 32 and 33, respectively, are photographic reproductions similar to FIGS. 26 and 27, here taken after the web has been drawn or stretched in the machine direction; and, FIGS. 34 through 37 illustrated, in plan view, exemplary alternative adhesive patterns that may be used for the base web in practicing the method of the present invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

In practicing the method of the present invention in its preferred form, a base web of fibers is first prepared and an open adhesive pattern is applied to one side of the web. The base web is then bonded to the open adhesive pattern and a second adhesive pattern is applied to the first pattern.

Different procedures have been used in preparing the base web. For example, textile length fibers may be processed through conventional cotton card machinery to produce a carded web for the base web. In such a carded web 50% to 70% of the fibers may be oriented substantially parallel with the machine direction. It has been found, however, that the most uniform product has been attained with the method of the present invention by using these webs having a higher percentage of fibers aligned in the machine direction such, merely by way of example, as a highly drafted web, which as a result of the drafting process, 80% to 95% of the fibers may be aligned with the machine direction. Such webs of bonded, highly drafted fibers, of course, have substantial utility in themselves and are the subject, for example, of the aforesaid copending application, Ser. No. 79,287 and U.S. Pat. No. 3,553,065. The present invention, however, goes far beyond the preparation of an adhesively bonded carded web or the product or methods disclosed in those two applications, and results in the formation of a high-loft, nonwoven fabric having significantly different characteristics than the nonwoven web utilized as the base material.

Additionally, the aforesaid copending applications, Ser. Nos. 769,959 and 820,224, assigned to the same assignee as the present application, each disclose a method of making a high-loft, nonwoven fabric by preparing a base web of fibers and in bonding the web to a single open pattern of adhesive. Thereafter, the open pattern of adhesive is reactivated and consolidated into a substantially continuous backing layer (Ser. No. 769,959) or partially consolidated into a discontinuous backing layer (Ser. No. 820,224), while simultaneously looping the fiber portions extending across the open spaces of the adhesive outwardly from the backing layer formed by the consolidated or partially consolidated adhesive therein. The resulting product is characterized by the high-loft or the pile of the loops of the fibers which extend outwardly from the adhesive backing. The particular depth of pile or degree of loft of the loops, of course, depends upon a combination of control parameters including, for example, the type and denier of the base fibers; the amount of spacing of the original adhesive pattern; the angle of the gathering blade; and the relative speeds of the fiber delivery to and fabric discharge from the gathering blade as is disclosed thereon.

Broadly stated, the method of the present invention involves taking a web of base material and performing the subsequent steps of: (1) bonding the web applied to the adhesive pattern; (2) applying a second pattern of second adhesive to the first pattern of adhesive; and, (3) consolidating or partially consolidating the adhesive into a backing layer while simultaneously looping the portions of the fibers extending across the open spaces of the adhesive outwardly from the backing layer. The resulting product is also characterized by the high loft or deep pile of the loops of fibers which extend outwardly from the adhesive backing. However, with the method of the present invention, the application of two adhesive patterns significantly increases the fiber attachment to the backing layer. Additionally, two different adhesives may be used, with the first having good fiber attachment qualities and the second having qualities to obtain good gathering for the backing. Such adhesive characteristics permit the use of heavier and/or thicker fibers, as well as threads and yarns, thus enabling the productions of more substantial and heavier fabrics that may be used as carpeting, for example.

It is to be noted, that attempts have been made to thicken the single adhesive pattern so that heavier fibers or threads could be used. However, it has been found that the quality of the high-loft fabric suffers, because the loops do not properly form or the ends thereof are not securely embedded within the adhesive. There is a tendency for the thick adhesive to smear or otherwise migrate out of the desired pattern, which has also caused improper loop formation in many instances. Other attempts have incorporated a squeeze roll to press the fibers into the adhesive and, although in some instances excellent fiber attachment was experienced, the phenomenon of improper loop formation was again experienced. One reason for this was apparently due to the fact that many fibers were pressed through the limited amount of adhesive in the pattern, thereby interfering with the tacky adherence to the heated roll in the adhesive consolidating station and causing slippage between the adhesive and the roll on the input side of the gathering blade.

Because many of the technical considerations are quite similar for the method of the present invention, as well as for the methods disclosed in the above mentioned applications for producing a high-loft, nonwoven fabric having a single adhesive pattern, the following detailed discussion will first include technical considerations that are involved with a single application of an adhesive pattern.

Turning now to the drawings, FIG. 1 schematically illustrates an exemplary apparatus for producing a high-loft nonwoven fabric. This apparatus includes a web forming section 10 and an adhesive compacting and fiber looping section 30. The web forming section 10 is generally similar to the apparatus disclosed in the aforesaid copending application, Ser. No. 79,287, with certain modifications as disclosed in the aforesaid U.S. Pat. No. 3,553,065, but it is here shown in more complete and visible form than shown in either of those disclosures. It will be appreciated as the ensuing description proceeds, that fiber webs made in accordance with the method disclosed in the aforesaid copending application, Ser. No. 79,287, are also usable with the subsequent method steps for producing the hereinafter described fabric, as are carded webs and webs prepared by other processes.

As shown in FIG. 1, multiple slivers 11 of textile fibers are drawn from their respective supply cans (not shown) into a draw frame 12 which comprises a series of pairs of grooved rolls 13; the rolls of each pair being driven by appropriate gearing (not shown, but well known in the art) at a peripheral rate of speed somewhat faster than the rate of operation of the preceding pair. Merely by way of example, the pairs of rolls 13 may be adjusted to provide an over-all increase in speed and, therefore, an extent of fiber draw on the order of 15:1 through the draw frame 12. As the juxtaposed slivers pass through draw frame 12, the individual fibers are drafted and spread out to form a flat, striated web of substantially alined fibers as shown at 14. Web 14 is maintained adjacent a supporting conveyor sheet 15 on the surface of which adhesive has been previously applied in a preselected pattern.

In this embodiment, the conveyor sheet 15 comprises an endless conveyor belt treated on at leaast its upper surface with a release agent. One example of such a belt comprises woven glass fiber with a surface coating of tetrafluoroethylene resin. Other examples of release coatings are well known, and comprise such materials as silicones, fatty acid metal complexes, certain acrylic polymers, and the like. Heat resistant films or thin metal sheets treated with release agents may also be used as the carrier sheet.

Prior to the time the web 14 is picked up by the belt 15, the latter has imprinted on its release-treated surface a pattern of flexible, thermoplastic adhesive such as is shown at 16 in FIG. 2. It will be understood that, as shown in FIG. 1, the adhesive is actually on the underside of belt 15 which becomes the upper surface after passing around roll 17, at which time the adhesive pattern 16 directly contacts the fiber web 14. The pattern is shown as being visible in FIG. 2 only for illustrative purposes.

The belt 15 is fed around roll 17 at a speed slightly in excess of the delivery speed of the final pair of rolls 13 of draw frame 12 in order to maintain web 14 under slight tension, whereby the individual highly-drafted fibers are retained in their alined and tensioned condition. Drive rolls 18, 19 are rotated (by suitable drive means, not shown) to drive belt 15 at a speed sufficient to maintain the proper tension on the web 14.

In the method shown for applying adhesive, the belt is fed through a nip formed between a printing roll 20 and a back-up roll 21 maintained in very light pressure engagement therewith. The surface of printing roll 20 is provided with an intaglio pattern to which adhesive may be supplied in various ways well known to those skilled in the art. For example, in the aforesaid parent application, Ser. No. 769,959, a system is schematically disclosed wherein the lower portion of the printing roll 20 picks up adhesive directly from a dip pan, with excess adhesive being removed by a doctor blade, thus leaving only the intaglio patterned surface filled. However, it has been found that more satisfactory results are obtained by pumping or otherwise transferring adhesive 22 from a supply pan 23 to a reservoir located immediately above an inclined doctor blade 24—the reservoir being defined in part by the upper surface of the inclined doctor blade and the adjacent portion of the rotating peripheral surface of the printing roll 20. Thus, as the printing roll 20 rotates (in a counterclockwise direction as viewed in FIG. 1), the intaglio patterned surface thereof is filled with adhesive 22, excess adhesive is removed by the doctor blade 24, and a metered amount of adhesive is then transferred to the underside of release coated belt 15 in a preselected pattern. The pattern shown in FIG. 2 is in the form of an open diamond pattern of adhesive.

The particular dimensions of the intaglio pattern employed and, indeed, the actual pattern itself, are not critical to the practice of the invention in its broadest aspects.

Thus, it has been found that patterns other than the illustrative diamond pattern hereinabove referred to can be utilized, and certain of such patterns will be subsequently described in connection with FIGS. 34–37. For illustrative purposes, however, it is noted that excellent results have been achieved where a diamond pattern was employed in which adjacent lines of adhesive were spaced apart in both directions by ¼", and wherein the intaglio printing roll 20 had adhesive cells or lines 0.007" deep and 0.025" wide. In certain instances, however, it has been found that the dimensions of the adhesive cells or lines, together with their spacing, are critical and must differ from the foregoing exemplary dimensions.

Since the surface of belt 15 is treated with a release coating, the adhesive remains substantially on the surface with no penetration therein and is preferably in a somewhat tacky condition. The printed belt is drawn from the printing nip around roll 17 positioned closely adjacent the output end of draw frame 12 and, as stated above, at a speed slightly in excess of the delivery speed of the last two rolls in the draw frame. The web 14 emerging from the draw frame 12 is deposited on the tacky adhesive 16 on belt 15 and held in tensioned engagement therewith by the adhesive and the above-mentioned speed differential. This continuous tension prevents the fibers in the web from losing their highly-drafted and alined condition.

In practicing the method, additional alined and highly-drafted fibers may be added to the web 14 on the adhesively printed belt 15. For this purpose, a second draw frame 25 similar to the draw frame 12 is provided to draw additional slivers 26 of fibers from their supply cans (not shown) and, after drafting and alining them, to deposit the fibers on the moving web 14 carried by the belt 15. In such cases, the amount of adhesive printed on the belt 15 may be increased to insure that some of the adhesive in the adhesive pattern 16 penetrates the fibers of web 14 drawn from the draw frame 12 and reaches the fibers drawn from slivers 26 which pass through the second draw frame 25. The arrangement is such that the adhesive contact between the fibers drawn from slivers 26 and the pattern 16, together with the speed differential of the belt 15 relative to the last pair of rolls in the draw frame 25, maintains the fibers drawn from slivers 26 under slight tension, whereby they also maintain their highly-drafted and alined condition.

The fibers deposited on the web 14 from draw frames 12 and 25 need not be the same kind, size, color or quantity. Nor, for that matter, do the fibers of the slivers 11 and 26 need to be uniform in these respects as they are drawn into the drawn lines 12 and 25. Thus, varous blends of fiber sizes, kinds, colors and quantities can be deposited across the web 14 from each of the draw frames 12 and 25 and in various combinations of first and second layers of fibers. Additional draw frames can also be employed if desired.

The fibers from each of the draw frames 12 and 25 pass under respective bars 27 and 28 before being deposited on the belt 15. The bars 27, 28 may be oscillated in a direction generally transverse to the movement of the web 14 and, preferably, provision is also made for controlling the frequency and amplitude of the oscillation of one bar relative to the other. Thus, as each bar is oscillated, the fibers deposited from the respective draw frames 12 and 25 take on a generally sinusoidal or sawtooth wave pattern of controlled frequency and amplitude. A simple, but somewhat similar, oscillating bar arrangement is disclosed in the aforesaid copending application, Ser. No. 553,483. However, the single bar arrangement there disclosed did not afford, nor even contemplate, the significantly improved attributes made possible by the present method.

An example of the web 14 formed on the illustrative apparatus 10 (FIG. 1) is shown in FIG. 2. As previously mentioned, a series of parallel and diagonally disposed lines of adhesive are printed in criss-cross fashion on the belt 15 to form a pattern 16 of adhesive having substantially open spaces in the configuration of diamonds. In depositing the fibers from the first drawn frame 12, the bar 27 was not, in this instance, oscillated. Thus, the fibers making up the first component 14a of the web 14 are substantially all alined in the direction of web movement. The fibers making up the second component 14b of the web, however, will be seen to be deposited in a generally wavy or saw-tooth pattern as a result of oscillation of the bar 28 associated with the second draw frame 25, thus altering the appearance characteristics of the finished fabric. In addition, oscillation of the bar 27 and/or 28 serves to alter the structural and functional characteristics of the fabric in that a controllable percentage of the fibers may be deposited on the open adhesive pattern at an angle to the machine direction. It has been found that such fibers do not interfere to any significant extent with the subsequent fiber looping steps. Moreover, it is believed that the presence of such fibers extending at an angle to the machine direction serves to increase the cross-directional strength of the fabric being produced by actually increasing the number of oriented fibers which extend partially in the fabric cross-direction. Preferably, when both bars 27 and 28 are oscillated they are oscillated in out-of-phase relation to one another so as to cause fibers in one web component 14a to cross fibers in the other web component 14b at even greater angles while simultaneously maintaining the fibers in a highly oriented state. It will, of course, be understood that the phase and amplitude of the oscillated fiber pattern may be selectively adjusted and controlled to provide a controlled angular deposition of fibers on the open adhesive pattern 16, thus enabling control of the cross-directional strength characteristics of the fabric resulting from fiber oscillation. This will, of course, vary dependent upon various other parameters such, for example, as the type of fibers employed, the type of adhesive employed, fiber-adhesive ratios, gathering ratios, and indeed, the particular end use to which the fabric is to be put. Consequently, in many instances it may not be desirable to oscillate either bar 27 or 28. It should be appreciated, of course, that FIG. 2 is only intended to be illustrative and, while the lines representing the fibers for both components 14a and 14b are spaced apart for clarity, in practice the highly-drafted fibers of both components are very close to one another.

Also for illustrative purposes, it will be noted that web component 14b has three bands of fibers designated color. These bands of fibers may be the same or different colors; but, in any event, they differ from the color of the balance of the fibers of web component 14b. Further, as previously mentioned, the fibers of web component 14b may differ from those of component 14a in kind, size, color or quantity depending upon the desired color pattern and surface characteristics of the final product, as more specifically described below.

Following deposit of web components 14a and 14b on the adhesive printed belt 15, the belt is drawn around a heated curing drum 29 where fusing and curing of the adhesive is substantially completed while the web 14 is maintained in firm contact therewith to bond the individual fibers. To insure effective heating and fusing of the adhesive, it is desirable that travel of the combined belt and web be around a substantial portion of the drum 29. In the illustrated embodiment, a fly roll 29a is positioned to apply tension on the combined belt and web as they travel around the drum 29 to insure complete embedment of the fibers in the adhesive. The fibers of the web 14 are thus bonded together while retaining their highly-drafted and substantially alined condition in the particular pattern in which they were deposited on the open pattern of adhesive 16 printed on the belt 15.

After leaving the fly roll 29a, the combined web 14 and belt 15 are preferably passed over the drive roll 19, which also serves as a cooling drum to set the adhesive.

The bonded web 14 is stripped from the release-coated surface of the belt 15 by the guide roll 31 as the web leaves the cooling drum 19.

While various well-known adhesives may be employed in the foregoing process, advantages reside in the use of plastisols, which are colloidal dispersions of synthetic resins in a suitable organic ester plasticizer, and which, under the influence of heat, provide good binding power while remaining soft and flexible. While many adhesives of this type are known, those found particularly useful for incorporation in the product of this invention include vinyl chloride polymers, and copolymers of vinyl chloride with other vinyl resins, plasticized by organic phthalates, sebacates, or adipates. These provide a fast curing plastisol adhesive characterized by relatively low viscosity, low migration tendencies, and minimum volatility. Such adhesives remain soft and flexible after curing, and can be reactivated by subsequent heating.

It has been found that other adhesives may be employed in the process—for example, organisols utilizing resins such as the vinyl chloride polymers and copolymers. Furthermore, still other adhesives may be employed provided that they satisfy specified characteristics in the base web produced in the web forming section 10, and in the finished fabric produced in the adhesive compacting and fiber looping section 30 (FIG. 1). In general, such adhesives should be applied to the base web by procedures which will not disarrange the fibrous structure of the web; such adhesives should heat-set at temperatures below the degradation temperature of the fibers in the base web 14 to secure bonding of the fibers to the adhesive; such adhesives should be reactivatable in the subsequent adhesive gathering and consolidation stage of the process; and such adhesives should form a flexile backing layer for the finished fabric and should strongly bond the fiber loops in place. For example, emulsions of thermoplastic resins such as acrylics and rubber-like compounds, illustratively ABS, have the requisite properties to serve as the bonding adhesive for the web 14.

The base material, made as heretofore described and comprising a web 14 of highly-drafted fibers embedded in an open adhesive pattern, is fed into the adhesive consolidating and fiber looping section 30 of the apparatus shown in FIG. 1. As shown here, the web 14 continues directly from the web forming section 10 to the consolidating and looping section 30. It should be appreciated, however, that the web 14 discharged from section 10 could be rolled up for storage or transport and then subsequently unrolled and fed into section 30. Also, as previously mentioned, other webs such, merely by way of example, as those made in accordance with the methods disclosed in the aforesaid copending application, Ser. No. 79,287 and U.S. Pat. No. 3,553,065, can be further processed in section 30.

As illustrated in FIG. 1, the web 14, while still under tension, is fed around an idler roll 32 and on to the surface of a heated forming drum 37. In its preferred embodiment, the drum 37 is made of metal with a highly polished, chromium plated surface which is heated and maintained at a temperature of approximately 250° F. Also, the web 14 is arranged to travel a substantial distance around the drum 37 with the open pattern of adhesive 16 in contact with the heated drum surface. As the web 14 is fed onto the drum 37, the heat from the drum surface reactivates and softens the adhesive printed on the underside of the web, causing it to be tacky and to adhere slightly to the drum surface, thereby maintaining the web under constant tension. The drum temperature, which is maintained at about 250° F., is, however, maintained below the melting point of the adhesive to prevent dispersion of the adhesive into the fibers of the web.

The web 14 of fibers and softened adhesive is reformed by the cooperative action of the drum 37 and a gathering blade 38 having a flat edge 39. The blade edge 39 operates to consolidate the open adhesive pattern 16 into a substantially continuous backing layer of adhesive, while simultaneously looping the fibers of the web outwardly from between the open spaces in the original adhesive pattern. The reformed and consolidated material 40 then leaves the blade edge 39 and moves onto a flat take-off surface 41 and a discharge conveyor 52.

Turning now to FIGS. 7–9, the method of making the novel high-loft, nonwoven fabric 40 will be explained in greater detail in connection with an illustrative sequence of the gathering and looping of a single fiber of the web 14 and the consolidation of its two original points of adhesive attachment in the pattern 16. As seen in FIG. 8, the fiber has a portion P which extends across the open space of the diamond pattern of adhesive 16 from point A to point B where it is embedded in the adhesive. Referring to FIG. 7, the series of views in this figure illustrates how the portion P of the fiber is formed into a loop; viz, when point A being carried around the heated drum 37 impinges against the gathering blade edge 39, its forward motion is halted and it is scraped along the surface of the drum, while point B continues to advance with the drum surface since, due to its softened and tacky condition, it adheres to the smooth drum surface. As point B advances relative to point A, the portion P of the fiber between points A and B is caused to bow outwardly from the drum surface. Finally, point B overtakes point A and these points of adhesive are substantially consolidated as seen in FIG. 9. In the meantime, fiber portion P has been looped outwardly from the drum surface.

It will, of course, be understood that while looping of fiber portion P is occurring, additional adhesive points C–D, etc., travelling around the drum 37 impinge against the gathering blade edge 39 causing a consolidation of these adhesive points and looping of their intermediate fiber portions $P_1$ as is also indicated in FIG. 9. This occurs simultaneously at all points across the web at the blade edge, producing a substantially continuous backing layer of adhesive from which extends the multiplicity of loops formed by the fibers of the base web. The thus formed substantially consolidated layer of adhesive is carried away from the blade edge 39 along the take-off surface 41 and provides a substantially continuous backing layer for the outwardly looped fibers, thus producing the fabric 40.

While in the preferred form, it is desired to achieve substantially complete consolidation of the adhesive into a continuous backing layer, in practice it has been found that the degree of consolidation varies randomly throughout the substantially continuous backing and, therefore, it is possible to draw the fabric slightly, thus producing a substantially continuous adhesive backing layer with random openings therethrough. Since complete consolidation, while desirable, is not necessarily attained in practice, the degree of consolidation is defined herein, and in the appended claims, in terms such as "to consolidate" the "open adhesive pattern into a substantially continuous adhesive layer." Thus, those skilled in the art will appreciate that terms such as "consolidate" as used herein and in the appended claims are intended to connote an arrangement for consolidating or compacting the open adhesive pattern into a substantially continuous adhesive backing layer—albeit that such "substantially continuous backing" may have, and often will have, small random fissures and gaps therein—all as distinguished from the arrangement disclosed in the aforesaid copending application, Ser. No. 820,224, wherein the open adhesive pattern is only partially consolidated to minimize bonding of adjacent lines of adhesive and thus form a discontinuous adhesive backing layer characterized by its elasticity and/or stretchability.

Another important feature is that not only does each fiber portion P loop outwardly from the drum surface but, also, as the loop is formed it turns, reaching a position in the fabric 40 generally perpendicular to the direction of the original alinement of fiber portion P. Thus, the fiber loops arrange themselves so that the plane of each loop is substantially normal to the original fiber alinement shown in FIG. 8. The reason for the loop twisting as it is formed may be explained by this observation. If two spaced points of a single fiber not in a web are brought together, it has been observed that the fiber will form a loop and, as the loop is formed, it twists towards a position of minimum internal stress, turning through an angle which tends to approach 180°. In carrying out the method, because of the great number of fibers in the web and their proximity one to another, each fiber loop engages the neighboring fiber loops with the result that all the loops are blocked from turning beyond the plane substantially normal to the machine direction, and are constrained in that position by the interference between the loops. In practice, of course, the actual direction and degree of loop twist depend upon the characteristics of the fibers in the original web 14.

It is important to note, however, that throughout the fabric the heights of the fiber loops vary according to the spacing between the points of attachment of each fiber to the open adhesive pattern in the base web. Referring to FIGS. 4, 8 and 9, it will be seen, for example, that the loop formed by the fiber portion $P_1$ between the points of adhesive attachment C, D will have a lower height than the loop formed by the longer fiber portion P between the points A, B. On the other hand, however, successive loops in adjacent diamonds, when viewed in a vertical section taken along the machine direction (FIG. 5), will have the same height since the fiber length P will remain the same between successive sets of points A, B. This results in a dense fabric with the lower loops supporting and filling around the higher loops and the top surface of the fabric being formed by the tops of the higher loops.

The appearance of a fabric so constructed depends not only on the height of the fiber loops but, also, on the type and denier of the fiber used in the base web, and one of the features of the invention is that the depth of the fabric and the evenness of the surface may be varied by adjusting selected ones of the control parameters, as will be explained below. In general, it may be said that for both relatively low and moderate height high-loft materials which have been produced with the method of this invention, the fabric appears to have a uniform thickness with a somewhat uneven surface texture. With very deep high-loft fabrics, particularly those made from flexible, low denier fibers, the higher loops tend to lay one over the other, thus providing a very soft, napped, fuzzy, fibrous surface.

To illustrate the effect of varying one of the control parameters, in this case, the angle of the edge of the blade 38 relative to the drum 37 will now be described. Referring to FIG. 6, it will be seen that the blade edge 39 forms an angle $\alpha$ with the line T tangent to the surface of the drum 37. It has been found that the blade edge angle $\alpha$ is one parameter that determines the depth of the fabric produced and the degree of uniformity of consolidation of the adhesive backing layer.

As a result of trying different blade angles, it has been determined that the preferred blade edge angle $\alpha$ when dealing with adhesive patterns having lines of adhesives spaced approximately ¼" apart is between about 17° and about 34°. With blades having edge angles within this preferred range, fabrics have been produced which are characterized by having a high degree of uniformity of consolidation of the adhesive backing layer which is substantially void of fissures or gaps and, by having a dense, regular mass of loops that provide a textured, somewhat uneven surface.

With blades having edge angles $\alpha$ less than 17°, difficulty has been experienced in obtaining a uniformly consolidated adhesive backing layer. This appears to be the result of insufficient relief between the blade edge and the drum surface for the fabric to flow evenly and smoothly off the drum surface as the result of the action of the blade, which produces varying degrees of consolidation of the adhesive and a non-uniform layer with fissures and gaps and scattered areas where the looping is irregular, tending to spoil the surface appearance of the fabric.

With blades having edge angles $\alpha$ substantially above 34°, it is difficult to achieve full consolidation of the adhesive. In some instances, the blade edge angles substantially above 34° result in a fabric being formed with pronounced ridges therein which may or may not be desirable. However, in the event that the adhesive is desired to be only partially consolidated, blade edge angles substantially above 34°, even approaching 120°, yield a product of acceptable quality. Such partial consolidation will subsequently be described in detail.

In practice, it has been found that one of the major factors affecting the thickness of the fabric is the loop height as determined and limited by the spacing between points of fiber adhesive attachment A–B, C–D, etc. (FIG. 8). To obtain the maximum thickness of fabric with a given adhesive pattern, the blade edge angle $\alpha$ should be such as to produce not only sufficient consolidation of the adhesive layer to provide good fiber attachment throughout the fabric but, also, sufficient consolidation to insure the production of a maximum number of full height fiber loops. Thus, as the blade edge angle $\alpha$ increases, the condition is approached where the web is being skived off the roll rather than being consolidated and gathered. The fabrics produced with higher blade edge angles $\alpha$ have reduced adhesive consolidation and fabric thickness because fewer loops reach their maximum height.

When using a blade 38 having an edge angle $\alpha$ within the preferred range for producing a fully consolidated backing, it has been found that the fabric loft may be regulated by changing the machine direction dimension of the adhesive pattern. Thus, by increasing this dimension, the height of the loops may be increased, thereby increasing the fabric loft.

Now turning to a consideration of a different control parameter—viz, the location of the take-away surface 41—the preferred location of the take-away surface is, as shown in the extreme right-hand view in FIG. 7, tight against the blade 38 and even with the outside corner 39' of the blade. With the surface 41 in this preferred location, the fabric may have a moderately even surface texture and a dense mass of loops forming a deep, high-loft pile.

It has been found that by lowering the take-away surface 41 a distance "Y" (FIG. 7) from its preferred location, the structure of the fabric will be drastically affected, in that the bulk of the fabric may be increased substantially by lowering the take-away surface 41. The effect of lowering the surface is somewhat similar to the effect from using a blade 38 with an edge angle $\alpha$ substantially above the preferred range for producing a fully consolidated backing, in that pronounced ridges are also produced in the fabric, thereby increasing its bulk. The amount that the take-away surface is lowered does clearly affect the degree of bulking, and it is apparently the case that as the distance "Y" increases, the fabric bulk increases.

A further related parameter that affects the gathering function of the blade is the take-away speed of the fabric from the blade edge. With blade 38 having an edge angle $\alpha$ within 17°–34° range, and a take-away surface at the preferred location, the take-away speed is desirably regulated to remove the newly formed fabric at the rate at which it is being formed, and it has been found that under these conditions the normal ratio of the surface speed of the heating drum 37 to the take-away speed will be about 12:1. By increasing the ratio up to, for example, 15:1, by slowing down the fabric take-away speed, more uniform adhesive consolidation has been obtained while the mass of the fiber loops is made somewhat more dense, so that a fabric with a higher weight has been produced.

By increasing the fabric take-away speed, such that the fabric is not allowed to gather at the blade edge 39, the fabric will be drawn or extended while the adhesive layer is still in a plastic condition, thereby opening the adhesive layer, thinning the fabric pile, and reducing the weight of the finished material.

Thus, by selection of the blade edge angle α, take-away ratio, and the height of the take-away surface 41, the fiber looping, fabric pleating plus bulk and basis weight of the fabric may be controlled to produce a product of desired characteristics.

Further parameters that affect adhesive consolidation and fiber looping at the blade edge 39 are: (1) the adhesive pattern applied to the fibers in the formation of the base web 14; (2) the adhesive weight as a percentage of the weight of the web; (3) and the area of the web covered by the adhesive pattern. The adhesive may be applied in the form of diagonal lines, criss-crossed, to provide an open diamond pattern with the size of the opening in the diamond in the machine direction being less than the length of the fibers used for the base webs.

Figure 34:
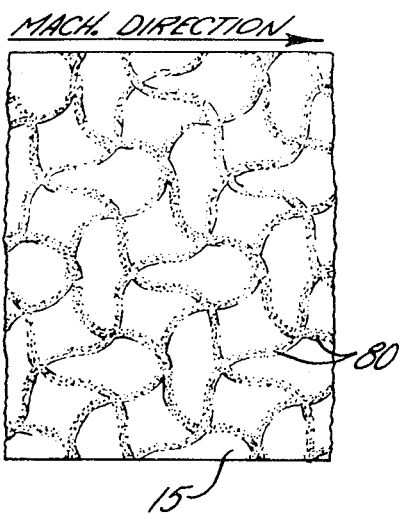

In addition to the diamond pattern, other adhesive patterns which may be used include unevenly spaced lines of application, such as criss-crossed sine waves 80 as shown in FIG. 34. The spacing of such lines of adhesive may furthermore be increased or decreased to change the maximum height of the element loops and, thus, the depth and surface texture of the finished material.

Figure 35:
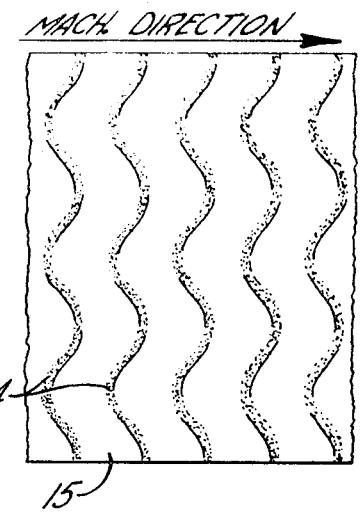
Figure 36:
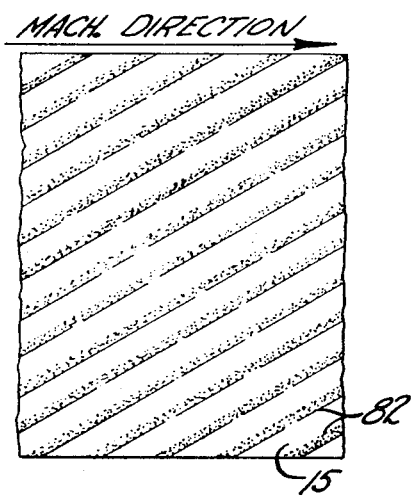
Figure 37:
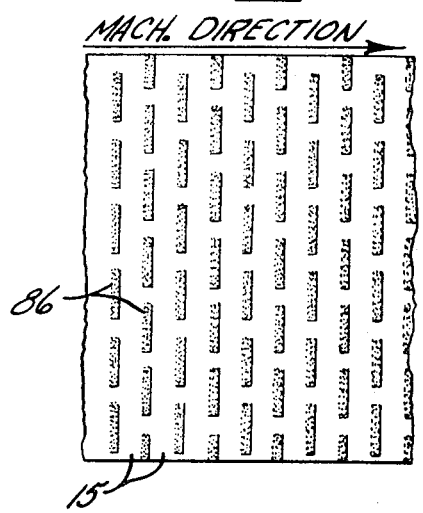

When criss-crossed lines of adhesive are used, the loops of the fabric will have varying heights due to the different spacings of the points of attachment (A–B, C–D—FIG. 8) of the base web elements to the adhesive. To produce a fabric with loops of uniform height, the adhesive is applied to the base web 14 in lines evenly spaced apart and extending across the web. Furthermore, the spacing between the lines of adhesive may be increased or decreased to obtain a higher or a lower pile height, as desired. Referring to FIG. 35, one such adhesive pattern is illustrated in the form of evenly spaced diagonal lines 82. Another such adhesive pattern is illustrated in FIG. 36, in the form of lines 84, each in the shape of a sine wave. A brick-like pattern is another such pattern as shown in FIG. 37. If broken lines of adhesive are utilized to obtain element looping—such, for example, as the brick-like pattern of FIG. 37—the gaps in the lines of adhesive 86 should be staggered so that the web elements longitudinally span the spaces between the adhesive lines and are securely attached to the adhesive.

When the spacing of points of attachment of the fibers to the adhesive varies regularly over the area of the base web as, for example, when an open diamond pattern of adhesive is used, the loops in the finished fabric will vary in height in a regular manner to provide a uniformly varying surface having a textured appearance. When, on the other hand, an open pattern of adhesive is used in which, in the cross direction of the base web 14, the lines of adhesive are parallel, or evenly spaced, it will be seen that the spacing of points of attachment of the elements to the adhesive will be uniform over the total area of the fabric, and the loops in the finished fabric will be of uniform height to provide a more even surface. The appearance of such a surface will, of course, be affected by the characteristics of the elements which form the loops. Thus, where the elements are yarn or heavy strands of fibers, the loops will be clearly visible, while where the elements are small diameter, flexible fibers, the surface will have a fibrous appearance, the fiber looping being less evident.

It has been observed that the transverse adhesive lines, when consolidated by the action of the gathering blade 38, are moved into proximity or abutment with each other and, being in a soft tacky state due to the high temperature of the heating drum 37, tend to bond to each other. However, the bond between lines of adhesive may be broken and the open pattern of adhesive substantially restored by drawing the fabric in the machine direction after the adhesive backing layer has been cooled, all as more clearly described in the aforesaid copending application Ser. No. 820,224. It may thus be demonstrated that the backing layer, while it appears to be continuous in the finished fabric, actually comprises lines of adhesive extending in the cross direction of the fabric and bonded to each other.

In the application of the adhesive to the base web, it has been observed that by increasing the adhesive viscosity, a sharp, distinct printed pattern will be obtained such that the fibers are securely attached to the adhesive at distinct spaced points and are not embedded in adhesive throughout their length. It is desired to have spaced points of fiber adhesive attachment so that the fiber loops will be distinctly and separately formed at the gathering blade in such a manner as to extend outwardly from the adhesive bonding layer. Fiber sizes between 1½ denier and 15 denier have been successfully utilized in the base web 14 with a ¼ inch diamond pattern of adhesive. It has been found that the degree of adhesive fiber attachment in the base web was affected when the fiber-to-adhesive ratio with such type fibers was substantially increased above 1:1, so that the fiber loops did not form properly at the blade 38, nor did the fibers have sufficient attachment to the adhesive layer in the finished fabric. On the other hand, increasing the relative amount of adhesive in the base web had the result of producing a thicker adhesive layer in the finished material and more secure fiber attachment, but the adhesive lines tend to disperse so that the pattern becomes less open, thereby affecting the height of the loops, which is undesirable.

Additional preliminary steps in the formation of the base web 14, as well as subsequent steps for processing the fabric 40 after it flows from the gathering blade 38, may be optionally carried out to alter the characteristics of the finished fabric.

Referring to FIG. 1, the base web 14, as has been previously described, may be formed of webs from two drafting frames 12, 25 supplied with staple length fibers or monofilaments. Patterns of color or of fibers which differ from the main constituent of the fabric may be introduced into the finished fabric 40 by utilizing certain preliminary steps in the formation of the base webs.

For example, the underweb from the first drafting frame 12 may be made from fibers of a solid color while at spaced intervals across the base web 14a bands of one or more colors may be introduced by passing colored fibers through the second draw frame 25 so that the colored fibers are laid on the underweb 14a. The top layer 14b of fibers may be applied in the pattern desired and, it has been found, will effectively screen out the underweb color in most instances so that the finished material will display a striped appearance.

The top layer 14b of fibers from the draw frame 25 may also be introduced in a wavy or saw-tooth pattern to produce either a wavy or saw-tooth effect completely across the fabric, as illustrated in FIG. 2, or in bands across the fabric as desired.

Alternatively, the under layer 14a of the base web 14 may embody different colored fibers by having the fibers at the margins, for example, of one color while the fibers across the center of the web are of a different color or colors. To this end, different colored fibers may be introduced through either or both draw frames 12 and/or 25. The top layer of fibers may be in the form of spaced bands of fibers across the web, or the different color may be introduced through only the second draw frame 25 by laying down a uniform layer of fibers in which at least certain of the adjacent slivers are of different colors. Where the top layer of the base web comprises spaced bands of fibers, it will be appreciated that the finished fabric will have a varying weight across the web, with a double weight and a more dense mass of loops in the bands where the top fibers are laid down.

Other procedures may be used for introducing patterns into the finished fabric. For example, a layer of fibers in the form of a section of a web from the second draw frame 25 may be laid on a web from the first draw frame 12 or onto a carded web underlayer. Due to the consolidation operation performed by the gathering blade 38, the pattern will be shortened lengthwise but not appreciably disarranged laterally, such that whatever the pattern introduced into the top layer of the base web 14, it will appear in the finished fabric in its fore-shortened form. A pattern of fibers may be introduced into the top draw frame 25, which will operate to aline the fibers and will draw or extend the pattern in the machine direction. The subsequent shortening ecect by the gathering blade 38 will tend to reduce the pattern to its original form in those instances where the extent of the draw in the drafting frame 25—illustratively 15:1—is approximately the same as the take-away ratio.

As shown in FIG. 1, the fabric 40 is carried along the take-away surface 41 by the action of the conveyor 52. Since the adhesive backing is hot and tacky as the fabric flows onto the take-away surface 41, that surface may be treated with a non-stick or release coating to insure that the fabric may be drawn smoothly along the surface.

To cool the belt of the conveyor 52 and prevent it from becoming overheated from the hot adhesive back of the fabric 40, streams of air may be blown against the underside of the belt from suitably placed air nozzles 54. This will also serve to cool the fabric 40, although it may be necessary or desirable to pass the fabric through a cooling station or zone (not shown) to cool the adhesive and thermoplastic fibers to temperatures below their softening temperatures or to eliminate tackiness of the adhesive.

The double printing of adhesive

In practicing the method of the present invention, and referring to FIG. 10, an exemplary apparatus for applying a second pattern of adhesive to overlie the first applied pattern includes a web forming section indicated generally at 10, which is substantially similar to the web forming section 10 of FIG. 1. The apparatus also includes an adhesive compacting and fiber looping section 30 which is also substantially similar to the compacting and looping section 30 of FIG. 1. Intermediate of the web forming section and the compacting looping section is an adhesive applicator section 100 that is adapted to apply a second pattern of second adhesive directly upon the first pattern of first adhesive.

After the web 14 is stripped from the belt 15 to pass around guide roll 31, the web 14 travels to a first cooling station 102 comprised of a number of rollers 104 which may be cooled to set the adhesive prior to passing around a guide roll 106 to correctly position the web for entering a second adhesive applicator station, indicated generally at 108.

To cure the newly applied pattern of adhesive, the web is fed from the adhesive applicator station 108 to a heated curing drum 112 which is similar to the drum 29. To insure effective heating and fusing of the newly applied adhesive, it is desirable that travel of the web be around a substantial portion of the drum 112, as was the case with the web and belt traveling around the drum 29. The web is then cooled by a second cooling station 114 comprised of a number of cooling rollers 116 to cool the web before being fed onto the surface of the heated forming drum 37.

In the method shown for applying the second pattern of adhesive, the application station 108 is substantially similar to the adhesive applying portion of the apparatus shown in the web forming section 10. Thus, the web is fed through a nip formed between a printing roll 118 and a back up roll 120 maintained in very light pressure engagement therewith. Adhesive 122 is pumped from a supply pan 124 to a reservoir defined in part by a doctor blade 126 and the adjacent portion of the rotating peripheral surface of the printing roll 118.

For the printing roll 118 to apply the second adhesive pattern to the pattern applied by the printing roll 20, it is necessary that the intaglio pattern of the two printing rolls 20 and 118 be substantially similar and that the printing rolls be interconnected through suitable gearing or the like (not shown) so as to maintain proper relative speeds of rotation of the printing rolls relative to each other. As is shown in FIG. 11, the second pattern 128 is shown to directly overlie the first applied pattern in general registry therewith, although the two patterns have been exaggerated for the sake of clarity. It is to be noted that the second pattern may not be in registry at all times with the first pattern in the event the rotational speeds of the two printing rolls 20, 118 are different.

In practice it has been found that perfect registration is not obtained between the two patterns of adhesive, even when using identical printing rolls 20 and 48, and in fact may not be desired, and that the misregistration results in a repeat pattern of relatively large diamonds, hesive pattern 16 during transit of the web between the such misregistration and pattern being particularly noticeable in FIGS. 20-25. This phenomenon is believed to result, as least in part, from shrinkage of the first adhesive pattern 16 during transit of the wet between the first and second adhesive applicating stations. Thereafter, the web is passed through the adhesive consolidating and fiber looping section 30, resulting in a fabric 40′ having a backing layer 16′ that is comprised of two layers 130 and 132 as is shown in FIGS. 11 and 12.

Referring to the photographic reproductions of FIGS. 14 through 33, a fabric made in accordance with the method of the present invention is comprehensively illustrated. All of the photographs are of a substantially similar basic fabric, with some of the views illustrating changes in the fabric as a result of changing the control parameters during the consolidation step. For example, FIGS. 14 and 15, respectively, show top and bottom views of a fabric with a fully consolidated adhesive backing which is substantially continuous except for random fissures or gaps occurring therethrough.

As a result of increasing the angle α, and increasing the take-away speed from the gathering blade 39, a fabric having a partially consolidated backing is produced as shown in FIGS. 20-23. The backing layer is not continuous but has the appearance of the regularly occurring diamond pattern throughout because of the diamond pattern of adhesives.

FIGS. 24 and 25, respectively, are enlarged photographic reproductions of a partially consolidated fabric that has been subsequently drawn or pulled apart in accordance with a portion of the method as hereinbefore described. The small diamonds occurring throughout the fabric are pulled in the machine direction resulting in the small hexagonal configurations.

The remaining photographic reproductions are cross sectional views of the various fully consolidated, partially consolidated, and drawn partially consolidated fabrics in the machine and cross directions suitably magnified. These reproductions were taken by immersing the fabrics in a clear plastic which, after hardening, were cut in either the machine or cross direction and photographed.

It is noted that multitude of dots occurring in the figures are the outwardly looped fibers that have been cut, and therefore show those loops to be substantially parallel to the camera angle. With this in mind it is evident that substantially more of the loops do lie in the cross direction as hereinbefore described. The density of the loops necessarily decreases as the degree of consolidation decreases. (Cf. FIGS. 16–19 with 26–29, for example.)

Many different staple length natural fibers and various synthetic fibers as well as blends thereof may be used in preparing the web 14. For example, rayon, acrylics, olefins, polyesters, acetates, nylon and other synthetic fibers in staple length or monofilament form may be used for the preparation for the base web.

In accordance with an aspect of the present invention, flexible threads, yarns or strands may also be used for forming a base web, provided that the flexibility of such elements is sufficiently high to permit looping of the fibers and turning of the loops in the manner hereinbefore described. To obtain regular loops of such elements in the finished material, it is clear that substantially all of the elements should be parallel and extend longitudinally of the web, for loop formation will be interfered with by those elements that substantially depart from the longitudinal alignment.

It has been found that to produce a material fully in accordance with the present invention, the elements should be sufficiently flexible to allow the loops to form and to twist normal to the machine direction while being formed under the action of the adhesive consolidating and gathering blade 38. However, heavier denier fibers or yarns and threads may be used because of the additional adhesive pattern being applied to the first pattern, thus permitting permanent embedment of the fibers or similar elements in the adhesive while insuring that the fibers do not project through the adhesive in such a manner as to interfere with the subsequent consolidation of the adhesive. Indeed, in some instances it may be desirable to provide a back-up roll (not shown) which, together with roll 112 (FIG. 10), forms a nip, the back-up roll serving to securely embed the fibers in the adhesive.

Although any of the adhesive hereinbefore mentioned may be used in the preparation of the base web 14, an added advantage of the double application of adhesive is the fact that the adhesives applied in each of the patterns may be different, with each of the different adhesives having characteristics contributing to a better quality fabric. For example, the adhesive applied in the first pattern may be characteristically adapted to enhance the fiber holding or retaining quality, while the second adhesive applied to the first pattern may have qualities that contribute to better consolidation during the adhesive consolidating and fiber looping step.

The resulting effect is that threads, yarns as well as heavier denier fibers may be used to produce a more substantial fabric 40' than may otherwise be possible in the event that only one application of adhesive is applied. Additionally, the two step application of adhesive enables proper loop formation during the consolidation step which, as previously mentioned, often occurs when a single thick application of adhesive is used.

Thus, sufficient adhesive is applied by practicing the method of the present invention to enable secure fiber attachment of heavier fibers, and the problems commonly associated with a single thick application of adhesive have been successfully eliminated.

We claim:
1. A method for producing a high-loft, nonwoven fabric, which comprises:
 preparing a web including flexible elements extending longitudinally of the web;
 bonding the elements in a first open pattern of first adhesive;
 applying a second open pattern of second adhesive to the first adhesive;
 reactivating the adhesives to a tacky state;
 consolidating the open patterns of tacky adhesives at a consolidating station
  (i) to form a backing layer;
  (ii) while looping the element portions located in the open spaces of the adhesive patterns outwardly from the backing layer; and,
 conveying the consolidated backing layer and outwardly looped elements away from the consolidating station.

2. The method to claim 1 in which the web elements are staple length fibers.

3. The method according to claim 2 in which the fibers are natural fibers.

4. The method of claim 2 wherein the fibers are synthetic.

5. The method according to claim 2 wherein the fibers are a blend of natural and synthetic fibers.

6. The method of claim 1 wherein the first and second adhesives have similar chemical compositions.

7. The method of claim 1 wherein the open patterns of tacky adhesives are substantially fully consolidated to form a substantially continuous backing layer.

8. The method of claim 1 wherein the open patterns of tacky adhesives are partially consolidated into the adhesive backing for the outwardly looped elements; and
 the partially consolidated adhesive backing and outwardly looped elements are conveyed away from the consolidating station at a rate sufficient to minimize bonding of the adhesive backing while allowing the outwardly looped elements to cool, thereby producing a high-loft, nonwoven fabric having elastic properties in the machine direction.

9. A method as defined in claim 1 wherein said second pattern of second adhesive is substantially similar to the first pattern and is applied in general registry with said first pattern.

10. A method for producing a high-loft, nonwoven fabric, comprising the steps of:
 introducing a web including flexible elements extending longitudinally thereof;
 bonding the elements in a first open pattern of first adhesive;
 applying a second open pattern of second adhesive to said first adhesive, the combination of said first and second open patterns defining a composite open pattern of adhesive that is of increased thickness where said first and second patterns overlap in registry and of reduced thickness where said patterns are misregistered;
 reactivating the adhesives to a tacky state;
 consolidating the composite open pattern of tacky adhesives at a consolidating station
  (i) to form an adhesive backing layer;
  (ii) while looping the element portions located in the open spaces of the composite open pattern outwardly from the adhesive backing layer; and
 conveying the consolidated backing layer and outwardly looped elements away from the consolidating station.

11. A method for producing a high-loft, nonwoven fabric, comprising the steps of:
 introducing a web including flexible elements extending longitudinally thereof;
 bonding the elements in a first open pattern of first adhesive;
 applying a second open pattern of second adhesive to said first open pattern of first adhesive, the combination of said first and second open patterns defining a composite open pattern of adhesives that are of increased thickness where said first and second patterns overlap in registry, and of reduced thickness where said first and second patterns are out of register;
 feeding said web and adhesives onto a smooth movable surface with said composite open pattern of adhesives in contact with said surface, softening said adhesives to a tacky state so that said adhesives adhere to said surface, carrying said web on said surface to the edge of a gathering blade and impinging said elements and softened adhesives against the edge of a gathering blade to loop the portions of said elements spanning the open portion of said composite open pattern of adhesives outwardly from said web and to consolidate said composite open adhesive pattern into an adhesive backing layer;

conveying said adhesive backing layer and outwardly looped elements away from said surface and said gathering blade.

12. A method as defined in claim 11 wherein said second pattern generally overlaps said first pattern in registry throughout, such that said composite open pattern of adhesives is substantially similar to said first open pattern of adhesives, said composite open pattern of adhesives being of increased thickness throughout.

References Cited
UNITED STATES PATENTS

| | | | |
|---|---|---|---|
| 3,214,323 | 10/1965 | Russell et al. | 166—148 |
| 3,220,056 | 11/1965 | Welton | 18—19 |
| 3,236,718 | 2/1966 | Cohn et al. | 161—128 |

ROBERT F. BURNETT, Primary Examiner

R. O. LINKER, JR., Assistant Examiner

U.S. Cl. X.R.

156—152, 183; 161—67